D. W. EDWARDS.
WOOD TAP.
APPLICATION FILED FEB. 28, 1910.
992,946.
Patented May 23, 1911.
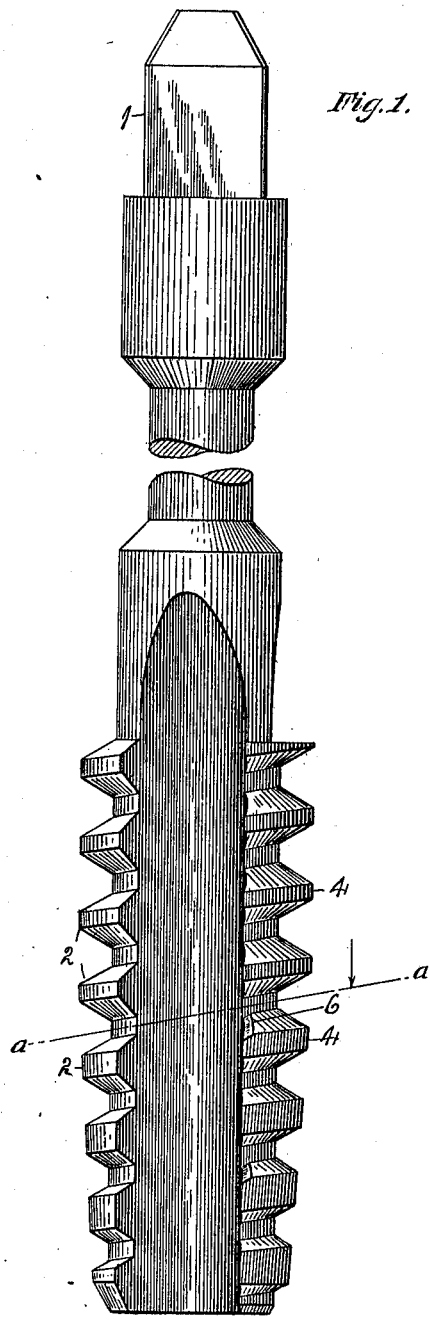
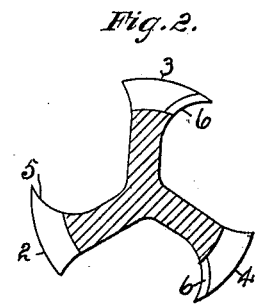
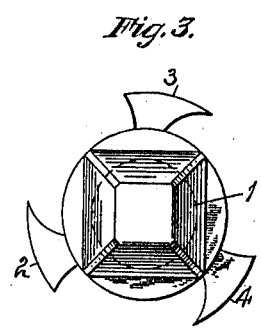
Witnesses:
W. L. Dow.
E. Behel.
Inventor:
Daniel W. Edwards
by A. O. Behel
Attorney

UNITED STATES PATENT OFFICE.

DANIEL W. EDWARDS, OF ROCKFORD, ILLINOIS, ASSIGNOR TO GREENLEE BROS. & COMPANY, A CORPORATION OF ILLINOIS.

WOOD-TAP.

992,946.  Specification of Letters Patent.  Patented May 23, 1911.

Application filed February 28, 1910. Serial No. 546,363.

*To all whom it may concern:*

Be it known that I, DANIEL W. EDWARDS, a citizen of the United States, residing at Rockford, in the county of Winnebago and State of Illinois, have invented certain new and useful Improvements in Wood-Taps, of which the following is a specification.

The object of this invention is to construct a tap for forming screw-threads in wood material.

In the accompanying drawings, Figure 1 is a side elevation of a tap containing my improvements. Fig. 2 is a section on dotted line *a a* Fig. 1. Fig. 3 is an end view.

The tap has the general characteristics of an ordinary tap and comprises a shank 1 having three sections 2, 3 and 4 of screw-threads. Fig. 2 is a section on dotted line *a a* Fig. 1, in which the three sections of threads are clearly shown. The section 2 of the screw-thread next below the dotted line *a a* has a cutting edge 5, while the sections 3 and 4 are each formed with a cut-away portion 6. Each thread between the dotted line *a a* Fig. 1, and the point of the tap has one section formed with a cutting edge, and the other two sections are formed with the cut-away portions 6, while all the screw-sections between the dotted line *a a* Fig. 1, and the shank end 1 of the tap are formed with cutting edges.

The object in forming the screw-sections with the cut-away portions is to remove the cutting action from such sections, thereby forming simply followers of them so that they will follow the cut made by the single screw-section of the series of sections of a thread. If each section was a cutter, the tap would not lead in but would tear away the entire wood.

I claim as my invention.

1. A tap for forming threads in wood, comprising a shank having a screw-thread divided into a plurality of sections by grooves extending in the lengthwise direction of the shank, certain of the sections being formed with both upper and lower cutting edges, and other sections having certain of said edges removed.

2. A tap for forming threads in wood, comprising a shank having a screw thread of progressively increasing radial thickness divided into a plurality of sections by grooves extending in a lengthwise direction of the shank, certain of the sections being formed with both upper and lower cutting edges, and other sections having their front upper cutting edges beveled off at an angle to the upper face of the threads and also to the front faces of the sections.

In testimony whereof I have hereunto set my hand in presence of two subscribing witnesses.

DANIEL W. EDWARDS.

Witnesses:
A. O. BEHEL,
E. D. E. N. BEHEL.

---

Copies of this patent may be obtained for five cents each, by addressing the "Commissioner of Patents, Washington, D. C."